Figure 1:
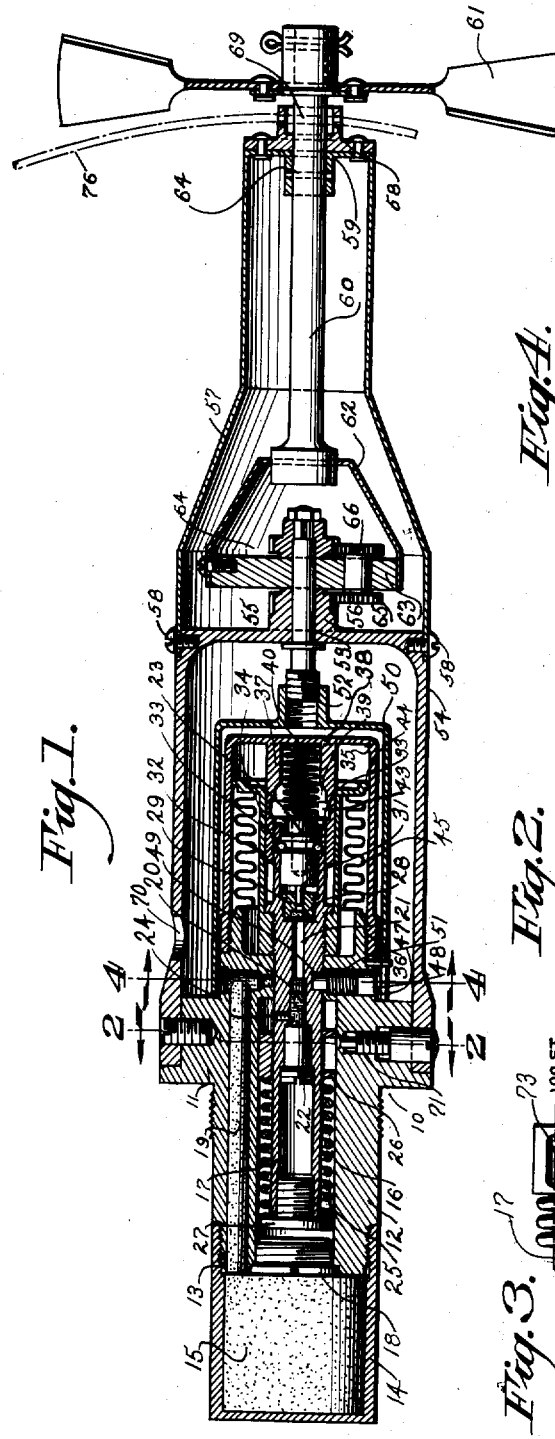

Sept. 22, 1953  R. L. GRAUMANN  2,652,777
HYDROSTATIC TAIL FUSE
Filed July 15, 1941

INVENTOR
Raymond L. Graumann
BY K. C. Caldwell
ATTORNEY

Patented Sept. 22, 1953

2,652,777

UNITED STATES PATENT OFFICE 2,652,777

HYDROSTATIC TAIL FUSE

Raymond L. Graumann, Alexandria, Va.

Application July 15, 1941, Serial No. 402,539

6 Claims. (Cl. 102—70)

(Granted under Title 35, U. S. Code (1952), sec. 266)

This invention relates to a tail fuse for an aircraft bomb, particularly to a tail fuse for an aircraft depth bomb of the type having a locked arming mechanism which is released only after the bomb upon which it is mounted has fallen a certain distance through the air and more particularly to the type of fuse in which the detonation of the bomb will be initiated by the fuse only after the bomb has penetrated the water a predetermined distance.

It is an object of this invention to provide a bomb fuse having a hydrostatic pressure sensitive member the movement of which, in response to a predetermined hydrostatic pressure, initiates the detonation of said bomb, the arrangement of parts being such that the hydrostatic pressure sensitive member in order to initiate detonation must move outwardly or away from the normal direction of travel of the freely falling bomb.

It is a further object of this invention to provide a bomb fuse, the transmission ignition trains of which are normally yieldably held out of alignment in the unarmed position until the high inertia forces produced by the deceleration of the bomb in traveling through the water have been appreciably reduced.

It is a still further object of this invention to provide a tail fuse for an aircraft depth bomb the transmission trains of which are arranged so that on heavy impact the fuse will tend to remain in an unarmed position regardless of the force of the impact.

It is another object of this invention to provide a tail fuse for an aircraft depth bomb with an adjustment for changing the depth at which the detonation of the bomb will be initiated.

It is also an object of this invention to provide a lock for a hydrostatic tail fuse which will prevent the detonator carrier member from being moved by the hydrostat to bring the transmission ignition trains into alignment thereby arming the fuse until the bomb has fallen freely a predetermined distance. The detonation of the bomb cannot therefore be initiated as a result of a severe impact, shock, or as a result of the forces of acceleration which acts upon the detonator carrier during the acceleration of the aircraft upon which it is mounted or as a result of the acceleration of the freely falling bomb.

When aircraft depth bombs are being loaded in the bombing racks of an aircraft they may be subjected to severe shocks or occasional jars, which could cause a premature detonation of the bomb. Furthermore, the members which are movable within the body of the fuse to initiate the ignition would, when mounted upon an aircraft, be subject to the same force of acceleration which acts upon the aircraft during flight. These forces of acceleration when acting upon these movable members could cause a premature detonation of the bomb unless some precautionary measures are provided in the design of a bomb which absolutely precludes any premature detonation caused by the movement of these members either as a result of an accidental impact or as a result of the forces of acceleration acting thereon.

In this invention I have provided a fuse designed to preclude premature detonation by providing a locking means for the movable detonator carrier member. This locking means retains the detonator carrier in a position wherein the transmission ignition trains are broken and held out of alignment so that even though a severe impact could cause the firing pin to free itself from its securing means and impinge against the percussion cap to initiate the ignition, the ignition would not be propagated to the booster charge to detonate the bomb because the transmission ignition train leading from the detonator is not in ignition conductive relationship with the booster charge of the fuse.

In order to be most effective depth bombs should be exploded at a predetermined depth below the surface of the water. As is well known, the explosive forces of a depth charge set off below the surface of the water, decreases as the distance from the charge increases, and the distance at which these forces are effective against a target determines the danger zone of the detonating charge. The fuse should preferably be set so as to initiate detonation of the bomb at a distance below the surface of the water equal to the radius of the danger zone, because the effective area of a target would be increased and the accuracy required in dropping a bomb would be accordingly diminished. Naturally, the danger zones are different for different types of vessels. In order for a bomb to be effective against a heavily armor plated vessel it should explode closer to the hull than is necessary when used against a vessel having lighter armor plating. It is important, therefore, to have an easily and readily accessible adjusting means the settings of which will accurately determine the depth at which the bomb will be exploded. Furthermore, when the bomb is used against submarines, the bomb should be set to explode at or near the submerged depth of the vessel.

In the prior art fuses, the detonation of depth bombs is initiated as a result of both the hydrodynamic and hydrostatic forces acting upon the bomb. Consequently, no accurate means of adjusting the depth at which detonation takes place can be provided since the hydrodynamic forces decrease as the penetration of the bomb in the water increases. This type of prior art fuse is also more likely to be set off upon impact, a result which is undesirable and in fact absolutely impossible with the depth bomb fuse of this invention.

In order to accomplish the foregoing objects I have provided a tail fuse which carries a tetryl booster charge and associated tetryl leads which connect the booster charge with a detonator and percussion primer, the major portions of the tetryl leads are formed in the body of the fuse while the remaining portions thereof are formed in a detonator carrier member. This carrier member is movable in the body of the fuse against the action of a spring or other suitable yieldable means. The spring or other suitable yieldable means normally retains the carrier in a position in which the tetryl leads are out of alignment. In order to bring these leads into alignment to arm the fuse a suitable hydrostat such as a hydrostatic piston, is connected to the detonator carrier member so as to move the carrier in the body of the fuse in a direction away from the booster charge and opposite to the normal direction of fall of the bomb. This hydrostatic piston will therefore arm the fuse when the forces transmitted by it are greater than the force of the spring and the inertia forces acting upon the bomb.

A firing pin is also positioned within the detonator carrier member so as to be spaced from the percussion cap. This firing pin is released to impinge against the primer only after the detonator carrier member is moved a distance equivalent to the distance required to bring the transmission ignition trains into alignment. The movement of the carrier member also compresses a firing pin spring which forces the piston firing pin against the percussion cap when the latter is released from the carrier member.

A locking means is provided which prevents movement of the detonator carrier member in the body of the fuse until the bomb has fallen freely through the air a required predetermined distance. Thus, even though the bomb were to accidentally fall overboard while being loaded on shipboard, it would not explode even though it were to reach a depth equivalent to the depth setting of the fuse. It should therefore be apparent that I have devised an extremely safe and yet sensitive fuse for an aircraft depth charge.

Figure 4:
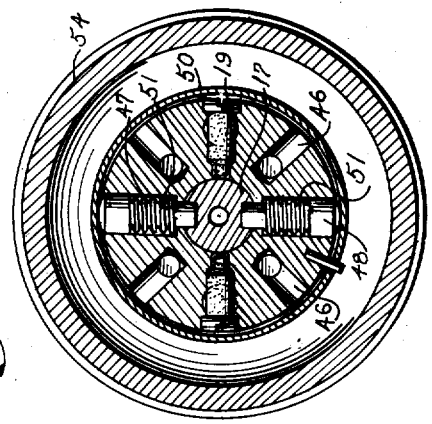
Figure 2:
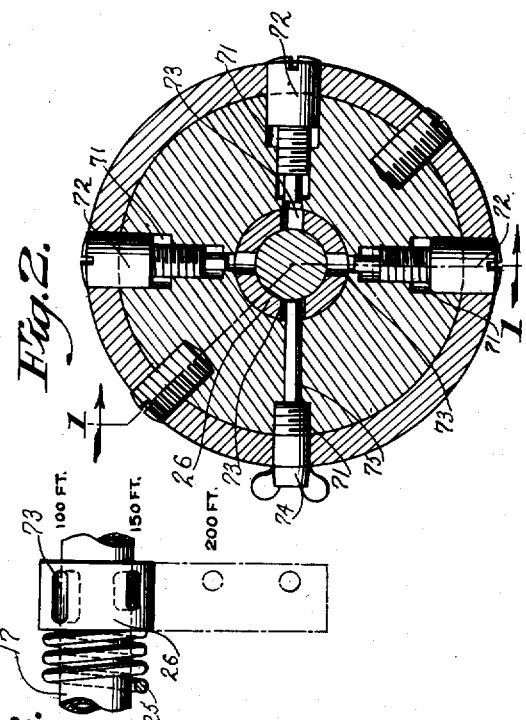
Figure 3:

Additional features and other objects of this invention will become apparent when considered in reference to the construction, combination and arrangement of parts hereinafter described and illustrated in the drawings, in which:

Fig. 1 is a cross-sectional elevational view of a bomb constructed in accordance with my invention, the section being taken on lines 1—1 of Fig. 2, Fig. 2 is a cross-sectional view taken on lines 2—2 of Fig. 1, Fig. 3 is a detail view showing the features of the depth adjusting collar, and Fig. 4 is a cross-sectional view taken on lines 4—4 of Fig. 1.

Referring now to the details of the construction illustrated in Fig. 1, the main portion of the fuse, indicated generally at 10, is provided with an enlarged annular portion 11, and a reduced neck portion 12. The diameter of the neck portion 12 is further reduced at an end which is threaded, as at 13, to receive a cylindrical cup shaped member 14 containing the tetryl booster charge 15. The body portion of the fuse is also provided with a longitudinal concentric bore 16 within which the detonator carrier member 17 is adapted to be slidably supported. The end of the bore adjacent the tetryl booster charge is provided with a suitable removable plug 18 which is provided to seal this end of the bore from the tetryl booster charge. Transmission ignition trains 19 are formed in the body portion of the fuse and are arranged so that one end of each is in ignition conductive relationship with the tetryl booster charge, while the other end of the trains communicates with the bore 16.

The detonator charge 20 is supported in a longitudinal concentric bore 21 formed in the detonator carrier member 17 and held in place by a suitable removable plug 22. The transmission ignition trains 24 are formed in the detonator carrier member so that one end of each is in ignition conductive relationship with the detonator 20. These trains 24 are formed in the body of the carrier so as to extend radially from the detonator 20 to the outer cylindrical surface of the carrier member, so that when the carrier member is moved longitudinally within the bore the transmission ignition trains 19 and 24 are brought into alignment. The spring 25 is positioned around the detonator carrier member so as to lie between the depth adjusting collar 26 and the flange plug 27 which is threadably secured in the end of the detonator carrier member 17. Thus the spring 25 yieldably holds the detonator carrier member 17 in a position at the limit of its forward movement, wherein the ends of the transmission ignition trains 19 remain out of alignment with the ends of the transmission ignition trains 24.

A percussion primer cap 28 is also securely held in the carrier member at the end of the bore 21 opposite the detonating charge 20 by a suitable plug 29. One end of the carrier member 17 has an annular flange portion extending therefrom forming a sleeve 32 into which a firing pin 31 is secured by means of a plurality of balls 33. The firing pin is retained in the position illustrated in Fig. 1 spaced from the percussion primer by means of these balls 33 which are recessed in the body portion of the firing pin and extend outwardly therefrom into the openings 34 which are drilled or otherwise suitably formed in the sleeve portion 32 of the movable carrier member 17.

A cylindrical cap member 35 is threadably secured to the body portion 10 of the fuse as at 36. This cylindrical cap member has an annular flange portion 37 which extends inwardly from the base 38 to form a cylindrical cavity or socket 39 into which an end of the firing pin spring 40 is placed. The other end of this spring surrounds the neck portion 23 of the firing pin body 31 and abuts against the shoulder 42 formed thereon. The inner diameter of the flange portion 37 is equal to or slightly greater than the outer diameter of the detonator carrier member and forms a guide therefor. The end of this annular flange portion 37 extends inwardly from the base a sufficient distance so as to cover the drilled openings 34 formed in the carrier member 17.

The inner surface of this flange is also provided with an annular groove 43 adapted to receive the balls 33 and release the firing pin 31 from its engagement with the sleeve portion 32 of the carrier member 17.

A hydrostatic piston 44 is threadably secured to the carrier member 17 and is slidable longitudinally within the cap 35 when subjected to hydrostatic pressure. A suitable Sylphon or bellows 45 is secured to this hydrostatic piston and to the body member of the fuse. Suitable openings 46 are drilled into the body member so as to communicate with the void space formed by the hydrostatic piston 44 and the Sylphon 45. Openings 47 are also drilled into the body portion of the fuse so as to receive the detents 48, each of which engages a recess 49 formed in the carrier member 17 when the detents are inserted into these openings 47 against the action of the spring means 51. These detents 48 securely hold the carrier member in the position shown in Fig. 1.

A cover 50 is positioned about the cap member and the body portion of the fuse so as to retain the detents 48 in their slot-engaging position. The opposite end of this cap is provided with a hub portion 56 which is internally threaded to receive the threaded end of the shaft 52. This shaft is rotatably supported in the bearing 53 formed in the end of the protective housing 54. A sun gear 55 is integrally formed about the hub portion 56 of the protective housing 54. The tail end of the housing 57 is secured to the main housing by means of screws 58 and extends rearwardly therefrom to form a support for the bearing 59 into which the shaft 60 is rotatably supported. An air-screw 61 is pinned to the shaft 60 at an end thereof. The other end of the shaft 60 has secured thereto a yoke member 62, the forked ends of which are secured to the block 63 which is preferably formed of Bakelite or other suitable plastic material and which is rotatable about the shaft 52. The planet gears 65 and 66 are rotatably supported in this block member 63 to form the differential 64. Gear member 65 meshes with the sun gear 55 while gear 66 is in mesh with the pinion gear 67, which drives the shaft 52. The bearing hub 59 has an annular shoulder extending along the shaft 60 so that a suitable arming wire may be inserted through the drilled openings 58 formed in the flange and the drilled openings 69 formed in said shaft member.

The protecting sleeve member 54 has a suitable vent 70 formed therein which connects with the void space formed about the cover 50 and allows the water into which the bomb has penetrated to reach the drilled openings 46 formed in the body member 10 of the fuse. A plurality of radially extending tapped openings 71 are drilled through the protecting sleeve and the body member 10 of the fuse so that the threaded pins 72 which are inserted therein will engage slots 73 which are formed in the depth adjusting collar 26.

The operation of the depth adjusting collar is as follows:

The lock screw 74 extends through the drilled openings 71 formed in the protecting sleeve and the body portion of the fuse to engage the pin 75 formed in the collar. When the collar is held in its locked position the spring member 25 is under maximum tension. In order to change the depth setting for the fuse the lock screw 74 is removed from its engagement with the depth adjusting collar. The depth adjusting collar 26 is then held in place by any one of the three remaining threaded pins 72, each of which engages a slot of different axial extent formed in the depth adjusting collars as illustrated in Fig. 3.

The operation of my bomb is as follows:

When the bomb to which this fuse is adapted to be attached is loaded on the bomb racks of an aircraft, the cover 50 securely holds the detents 48 into the position of locking engagement with the carrier member. A suitable arming wire 76 is adapted to be inserted through the drilled openings 58 and 69 formed in the hub of the tail housing and the air screw shaft respectively, in order to lock the air screw shaft 60 to the housing 57. When the bomb is released from its carrier rack this arming wire 76 is removed from its position of locking engagement with the shaft 60 so that the air screw 61 will rotate this shaft in its bearing 59, causing the planetary gears to rotate about the axis of the shaft 52, rotating this shaft to draw the covering member 50 away from its holding position with respect to the detents 48. As soon as the cover is drawn rearwardly by the action of the air screw the spring 51 will cause the detents 48 to fly radially outwardly of the body member of the fuse so as to disengage the detonator carrier member 17. The bomb fuse is now in the unlocked unarmed position and will remain in this position until the bomb has penetrated the water to a depth equivalent to the depth setting of the depth adjusting collar. When the bomb has attained this depth the water which has entered the protecting housing through the vent 70 and into the void space formed by the Sylphon 45 and hydrostatic piston 44 will cause the piston to move the detonator carrier member 17 so that the tetryl leads or ignition transmission trains 19 and 24 are brought into alignment.

When the carrier member 17 has moved this distance the openings 34 formed in the sleeve 32 will be radially aligned with the annular notch 43 so that the balls 33 will be freed of their locking engagement with the body of the firing pin 31. The firing pin will thus be released and the spring 40 will force it to impinge against the percussion primer cap 28 to initiate the detonation of the bomb.

It should be noted that in the position shown in Fig. 1, irrespective of any locking of the detonator carrier member by the detents 48, the carrier member could not be moved to the armed position upon impact of the bomb, because the inertia forces which would act upon this carrier member tending to move it upon impact are in a direction opposite from the direction in which this detonator carrier member must move in order to bring the ignition transmission trains into alignment to release the firing pin. Furthermore, the openings 46 formed in the body portion of the fuse and the vent 70 formed in the protecting sleeve are so arranged that the inertia forces of the bomb caused by the relative movement of the bomb through the water cannot act upon the hydrostatic piston to cause a premature detonation, or in other words, to cause the detonation to be initiated by the hydrodynamic forces present when the bomb is penetrating the water and before the bomb has attained a depth at which the hydrostatic forces alone would actuate the hydrostatic piston to initiate the detonation of this bomb.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

I claim:

1. A tail fuse for aircraft depth bombs, said fuse comprising, a body member, a stationary booster charge placed therein, a detonator carrier movable within the body member away from said charge and in a direction opposite to the direction of travel of the bomb to which the fuse is adapted to be attached, means responsive to the movement of said carrier for initiating the ignition of said booster charge, and hydrostatic pressure means for moving said carrier, last said means comprising a bellows surrounding said carrier, one end of said bellows being connected to said body member and the other end to said carrier, and means for admitting water to the interior of said bellows whereby detonation of the bomb will not be effected by impact if the bomb should strike an object but only after it has passed through a predetermined depth of water.

2. In an aircraft bomb fuze the combination including a movable ignition transmission train, a primer associated therewith, a stationary ignition transmission train, resilient means for retaining said movable ignition transmission train out of alignment with said stationary ignition transmission train, locking means for retaining said movable ignition transmission train in said position out of alignment with said stationary ignition transmission train, means responsive to the movement of the bomb through the air for releasing said locking means, hydrostatic pressure responsive means for moving said primer and movable ignition transmission train against the action of said resilient means to bring the same into alignment with said stationary ignition transmission train whereby the fuze will be armed only after the bomb to which it is adapted to be attached has fallen freely through the air a distance sufficient to release said locking means and penetrated the water to a depth at which the hydrostatic pressure acting upon said hydrostatic pressure responsive means is greater than the resistance offered by said resilient means.

3. A tail fuse for an aircraft depth bomb comprising an elongated body member having an opening through a side wall thereof, said member being adapted to be inserted in the rear end of said bomb with the longitudinal axis thereof parallel to the longitudinal axis of the bomb, a detonator carrier movably supported within said body member for movement along the longitudinal axis of said body member, said carrier including a recessed portion, yieldable means retaining said carrier in an unarmed position from which it is movable a predetermined distance to an armed position in a direction opposite to the normal direction of fall of said bomb, means responsive to the movement of said carrier through the predetermined distance against said yieldable means for initiating the detonation of said bomb, means locking said carrier member to said body comprising a pin resiliently held in the side wall opening of said body member and seated in the recess provided in said carrier so as to prevent said carrier member from being moved through said predetermined distance relative to said carrier, and means responsive to the movement of the bomb through the air for releasing said locking means after the bomb has traveled a predetermined distance.

4. In a depth bomb fuse, the combination comprising a tubular body member, a carrier member slidable within said body member, a primer and cooperating firing pin supported by said carrier member, a coil spring one end of which engages said carrier member to bias it in one direction to a first position, means for selectively fixing the position of the other end of said spring to vary the biasing action thereof, a hydrostatic pressure actuated device for moving said carrier in the opposite direction, and means actuated when said carrier member has moved a predetermined distance in said opposite direction to cause said firing pin to detonate said primer.

5. The combination in claim 4 wherein said means for selectively positioning the other end of said spring comprises a slidable collar engaging said other spring end and provided with a plurality of spaced slots, each said slot being of a different length, and a removable pin for each slot, each said pin extending through said body member into its associated slot.

6. In a depth bomb fuse, the combination comprising a tubular body member, a carrier member slidable within said body member, a primer and cooperating firing pin supported by said carrier member, a coil spring one end of which engages said carrier member to bias it in one direction to a first position, an adjustable collar engaging the opposite end of said spring, said collar being provided with a plurality of spaced and axially extending slots arranged such that successive slots progressively increase in length from a transverse reference base line, a pin for each slot, each said pin being threaded through the wall of said body member and extending into its associated collar slot whereby compression of said spring may be progressively decreased by unthreading said pins in succession from said collar slots, a hydrostatic pressure actuated device for moving said carrier in an opposite direction, and means actuated when said carrier member has moved a predetermined distance in said opposite direction to cause said firing pin to detonate said primer.

RAYMOND L. GRAUMANN.

References Cited in the file of this patent

UNITED STATES PATENTS

| Number | Name | Date |
| --- | --- | --- |
| 1,312,212 | Saloun | Aug. 5, 1919 |
| 1,314,663 | Huber | Sept. 2, 1919 |
| 1,368,569 | Minklen | Feb. 15, 1921 |
| 1,514,743 | Taylor | Nov. 11, 1924 |
| 1,533,756 | Panigatti | Apr. 14, 1925 |
| 1,639,075 | Bold | Aug. 16, 1927 |
| 1,639,665 | Pratt | Aug. 23, 1927 |
| 1,893,663 | Woodberry | Jan. 10, 1933 |
| 2,397,781 | Fischer | Apr. 2, 1946 |